UNITED STATES PATENT OFFICE.

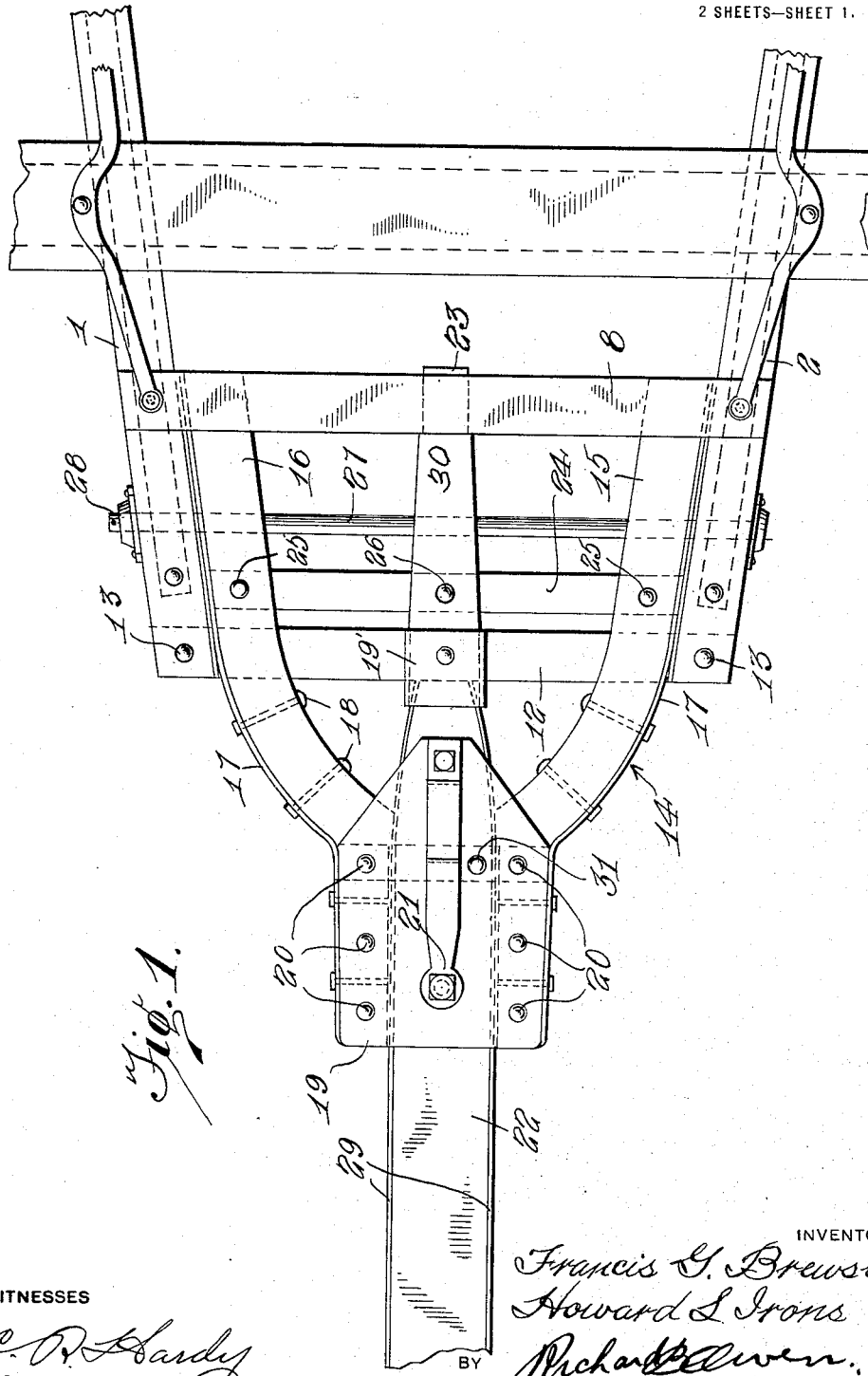

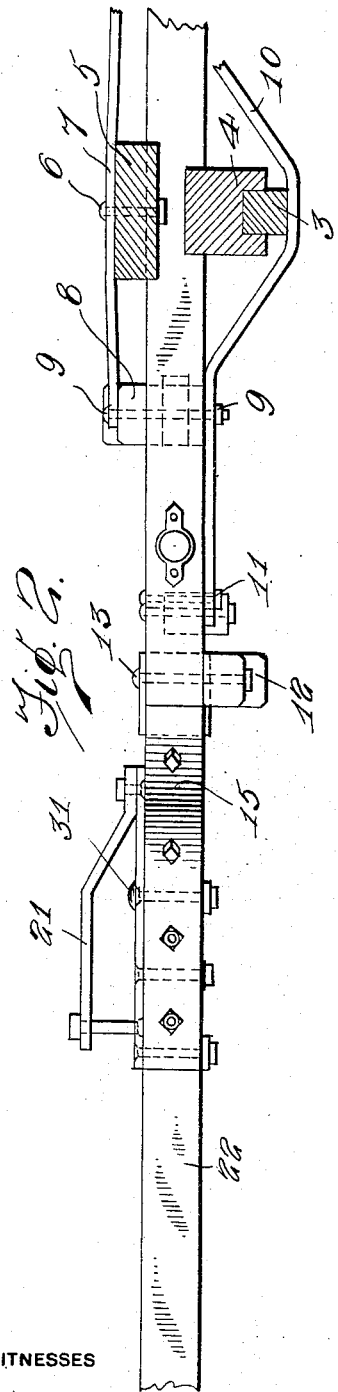
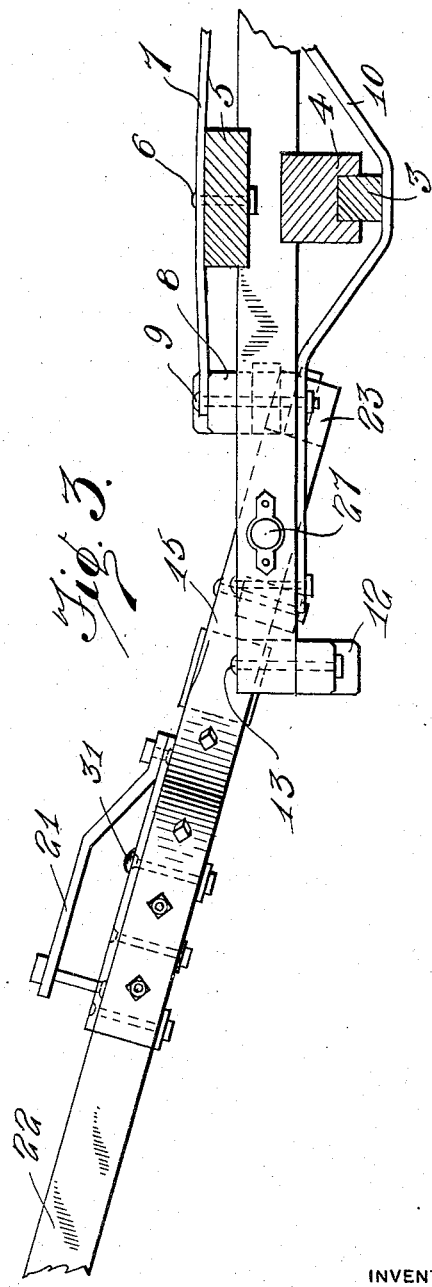

FRANCIS G. BREWSTER AND HOWARD L. IRONS, OF BRIDGETON, NEW JERSEY.

WAGON-TONGUE SUPPORT AND SLIP-TONGUE.

1,189,910. Specification of Letters Patent. Patented July 4, 1916.

Application filed September 27, 1915. Serial No. 52,926.

*To all whom it may concern:*

Be it known that we, FRANCIS G. BREWSTER and HOWARD L. IRONS, citizens of the United States, residing at Bridgeton, in the county of Cumberland and State of New Jersey, have invented certain new and useful Improvements in Wagon-Tongue Supports and Slip-Tongues, of which the following is a specification.

Our invention relates to a wagon tongue support so constructed that when the wagon embodying this support is passing over uneven ground no additional burden is placed on the horses.

One of the objects of the present invention resides in the novel means of pivoting the tongue and its complemental yoke to the hounds of the wagon.

Another object consists in providing means for limiting the movement of the tongue in a downward direction. And still another object resides in the particular construction of tongue yoke and wagon hounds.

With the above and other objects in view we will now proceed to describe the invention with reference to the accompanying drawings forming a part of this specification and wherein we have illustrated a specific embodiment of the invention.

In the drawings: Figure 1 is a top plan view of a tongue support constructed according to our invention. Fig. 2 is a side elevation of the same, and Fig. 3 is a similar side elevation but with the tongue raised.

In detail: The tongue support as shown is used in connection with the hounds 1 and 2 of a wagon, which are attached to the axle 3 thereof by means of the upper and lower cross members 4 and 5, between which the hounds are seated and held in place. Over the top of the cross member 5 extend plates 7, bolted to the cross member 5 at 6, and to a similar cross member 8 on the hounds 9, the last mentioned cross member being positioned forwardly of the cross member 5. Beneath the axle 3 extend tie members 10 which are bolted to the hounds by means of the said bolts 9 and by the bolts 11. At the forward ends the hounds are connected underneath by means of a cross piece 12 secured thereto by bolts 13.

The hounds converge slightly toward their forward ends and receive a yoke 14 comprising the arms 15 and 16 faced with iron plates 17 held in place by bolts 18. The arms 15 and 16 of the yoke diverge slightly and are connected at the crotch by means of the plate 19 held in place by bolts 20, and carrying the member 21 for attaching a doubletree. The tongue 22 extends beneath the plate 19 and slips into a socket 19' of a member or stem 30 carried by the yoke 14 and which at its rear end is provided with a reduced portion 23. The stem 30 is held in place by the tie bar 24 secured in the yoke by bolts 25 and fastened to the tongue by a bolt 26. Extending through the hounds 1 and 2, arms 15 and 16 of the yoke, and the pole stem 30 is a removable pin 27 held in place by the cotter pin 28, and this pin serves to pivot the yoke and member 30 to the hounds. The tongue 22 is preferably reinforced on each side by suitable plates 29 which prevent wear, and is held in place by the removable bolt 31 extending through the plate 19 and tongue 22.

In assembling the tongue support relative to the hounds the yoke 14 is first placed between the hounds, after which the pivot pin 29 is pushed through the said members and into place and fastened by the cotter pin. The tongue 22 is then slipped into place in the socket 19' and bolt 31 is pushed through the plate 19 and tongue 22. When assembled the tongue rests level due to the fact that it is limited in its downward movement by the cross members 8 and 12. However, by reason of the fact that it is free to move upwardly no additional burden is placed on the horses when the wagon travels over uneven ground.

While the above is a description of the preferred embodiment of the invention, it will be understood that various changes or alterations in the minor details of construction and arrangement of parts may be resorted to without departing from the spirit of the invention.

We claim:

1. The combination with wagon hounds, of a yoke, a stem projecting forwardly from the intermediate portion of the closed end of said yoke and being provided at its extremity with a socket, a tie bar connecting the arms of said yoke and supporting said stem adjacent its forward extremity, a pivot pin extending through said hounds, yoke arms and stem in the rear of said tie bar whereby the said yoke is supported for vertical oscillation, stops on the upper and under sides of said hounds to prevent the forward end of the yoke swinging below the plane of the hounds, a tongue for insertion in said yoke and to seat in said socket, and means for holding said tongue against forward movement, substantially as described.

2. The combination with wagon hounds, of a yoke arranged between said hounds with its arms projecting forwardly therefrom, a tie bar connecting said arms inwardly from their ends, a stem secured at one end to the base portion of said yoke intermediate the ends thereof and extending forwardly and being supported adjacent its opposite end by said tie bar, a socket at the forward end of said stem, a pivot pin extending through said hounds, yoke arms and stem whereby said yoke is supported for vertical oscillation, plates connecting the free end of the yoke arms to provide a tongue channel between the same, a tongue adapted for insertion in said channel and to seat in said socket, and a pin for connecting said tongue to said plates, substantially as described.

In testimony whereof we affix our signatures in presence of two witnesses.

FRANCIS G. BREWSTER.
HOWARD L. IRONS.

Witnesses:
A. R. McAllister,
E. V. Flanagan.

Copies of this patent may be obtained for five cents each, by addressing the "Commissioner of Patents, Washington, D. C."